(12) United States Patent
Ashihara et al.

(10) Patent No.: US 8,118,763 B2
(45) Date of Patent: Feb. 21, 2012

(54) WALKING ASSIST DEVICE

(75) Inventors: Jun Ashihara, Wako (JP); Yasushi Ikeuchi, Wako (JP); Toru Fujihira, Wako (JP); Yoichi Nishimura, Wako (JP); Hiroshi Kudoh, Wako (JP); Yutaka Hiki, Wako (JP); Makoto Shishido, Wako (JP); Tatsuya Noda, Wako (JP); Hiroshi Matsuda, Wako (JP); Yoshihisa Matsuoka, Tochigi (JP); Ryuzo Yokoyama, Wako (JP); Eiji Ninomiya, Tochigi (JP); Takeshi Koshiishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 261 days.

(21) Appl. No.: 12/470,091

(22) Filed: May 21, 2009

(65) Prior Publication Data

US 2009/0292232 A1 Nov. 26, 2009

(30) Foreign Application Priority Data

May 22, 2008 (JP) .................................. 2008-134085

(51) Int. Cl.
*A61F 5/00* (2006.01)

(52) U.S. Cl. .................................. 602/23; 602/16; 601/5

(58) Field of Classification Search ......... 601/5; 602/23
See application file for complete search history.

(56) References Cited

U.S. PATENT DOCUMENTS

| 5,476,441 | A | * | 12/1995 | Durfee et al. | .................... | 602/23 |
| 7,731,673 | B2 | * | 6/2010 | Hiki | ................................ | 602/16 |
| 2007/0050044 | A1 | * | 3/2007 | Haynes et al. | .................. | 623/24 |
| 2008/0108918 | A1 | * | 5/2008 | Joutras et al. | .................... | 601/34 |

FOREIGN PATENT DOCUMENTS

| JP | 2007-020909 | 2/2007 |
| WO | WO2006/126710 | * 11/2006 |
| WO | WO2006/129599 | * 12/2006 |

* cited by examiner

*Primary Examiner* — Patricia Bianco
*Assistant Examiner* — Raymond E Harris
(74) *Attorney, Agent, or Firm* — Rankin, Hill & Clark LLP

(57) ABSTRACT

Provided is a walking assist device including a seat member, a leg link having a joint portion, and a driving source for the joint portion. The walking assist device allows a user to rest by sitting on the seat member. Accordingly, the walking assist device further includes a lock mechanism disposed in the joint portion and an operation unit for the lock mechanism. When the operation unit is switched on, the driving source is controlled to increase an up-pushing force on the seat member. A variation rate on the up-pushing force is increased with time to a given value where the lock mechanism is initiated.

2 Claims, 6 Drawing Sheets

WALKING ASSIST DEVICE

PRIORITY CLAIM

The present application is based on and claims the priority benefit of Japanese Patent Application 2008-134085 filed on May 22, 2008, the contents of which are incorporated herein by reference in its entirety.

BACKGROUND OF THE INVENTION

1. Field of the Invention

The present invention relates to a walking assist device which assists a user in walking by alleviating a load acted on a leg thereof.

2. Description of the Related Art

Conventionally, there has been known a walking assist device having a seat member where a user sits astride, a leg link connected to the seat member and having an in-between joint portion, and a driving source for driving the joint portion (for example, refer to Japanese Patent Laid-open No. 2007-20909). The driving source in this type of walking assist device drives the joint portion to actuate the leg link in a direction of pushing up the seat member to support at least a part of a body weight of the user through the seat member, and as a result thereof, the walking assist device can assist the user in walking by alleviating a load acted on a leg thereof.

Meanwhile, it is often difficult for a user who utilizes the walking assist device to walk for a long time. However, it is impossible for the user to sit on a chair or the like with the conventional walking assist device mounted. Therefore, it is troublesome since the user has to remove the walking assist device so as to sit on a chair every time when the user takes a rest.

SUMMARY OF THE INVENTION

The present invention has been accomplished in view of the aforementioned problems, and it is therefore an object of the present invention to provide a walking assist device where a user can have a rest with the walking assist device mounted.

To attain an object described above, the present invention provides a walking assist device having a seat member where a user sits astride, a leg link which is connected to the seat member and is provided with an in-between joint portion, and a driving source for driving the joint portion, in which the leg link is actuated in a direction of pushing up the seat member according to the driving of the joint portion driven by the driving source to support at least a part of a body weight of the user through the seat member, including: a lock mechanism configured to lock the joint portion, and an operation unit configured to be operated by the user to actuate the lock mechanism.

According to the present invention, the operation unit can be operated by the user to actuate the lock mechanism to lock the joint portion, preventing the seat member from moving downwards. Thereby, the user can sit on the seat member with the walking assist device mounted to have a rest, without applying any forces to the leg thereof.

In the present invention, the operation unit is composed of an operation switch and a control unit, and the operation switch is configured to be switched on and off by the user. The control unit is configured to control the driving source to increase an up-pushing force applied to the seat member according to a descent amount of the seat member and to perform a control in which a variation rate on the up-pushing force applied to the seat member is increased with time according to the descent amount of the seat member when the operation switch is switched on. It is desired that the lock mechanism is actuated when the variation rate is increased to a given value. According thereto, when the seat member descends from a normal working height due to the enervation of the user's leg, the up-pushing force applied to the seat member is enhanced at an accelerated pace, and the lock mechanism is actuated thereafter. Thereby, the user can make a shift from walking to sitting on the seat member smoothly.

Furthermore, it is acceptable to configure the control unit in the present invention to control the driving source to increase an up-pushing force applied to the seat member according to a descent amount of the seat member when the operation switch is switched on, and to actuate the lock mechanism when the up-pushing force applied to the seat member is increased to a given value. Also, in this case, when the seat member descends from a normal working height due to the enervation of the user's leg, the up-pushing force applied to the seat member is enhanced, and the lock mechanism is actuated thereafter. Thereby, the user can make a shift from walking to sitting on the seat member smoothly.

DETAILED DESCRIPTION OF THE PREFERRED EMBODIMENTS

Figure 1:
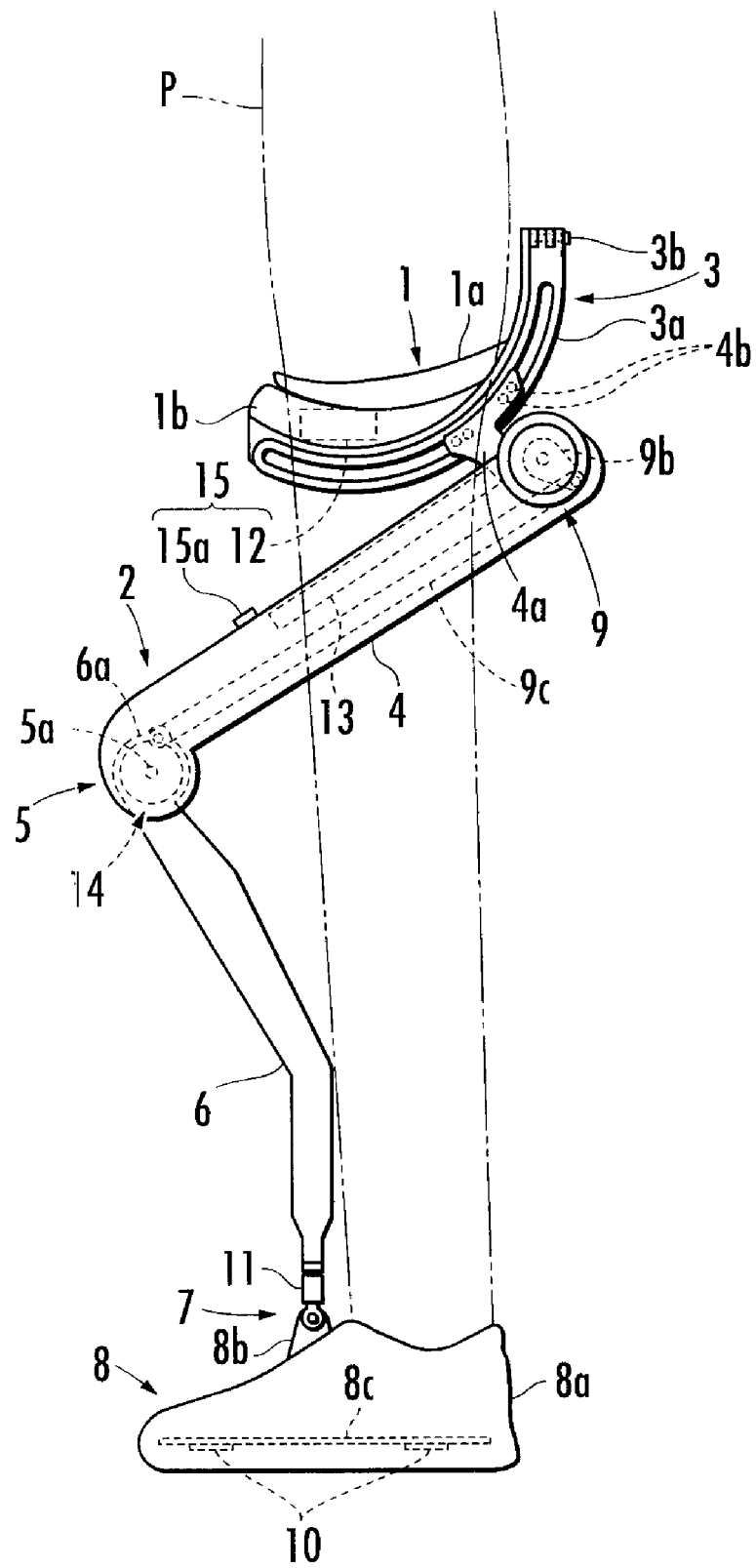
FIG. 1 is a side view of a walking assist device according to an embodiment of the present invention.
Figure 2:
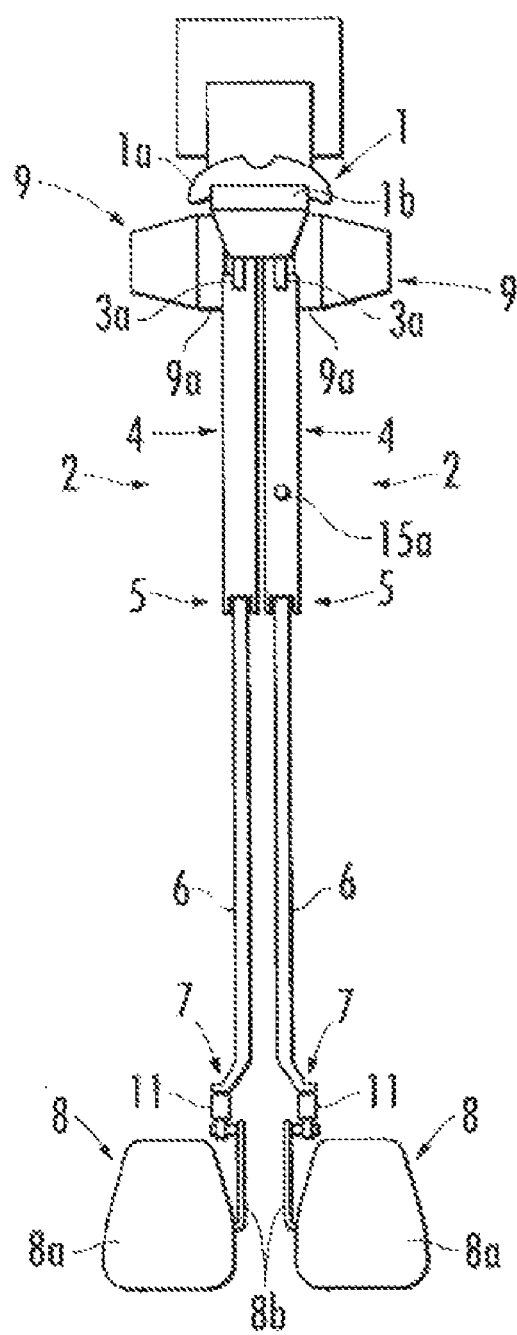
FIG. 2 is a front view of the walking assist device according to an embodiment of the present invention.

Hereinafter, a walking assist device according to an embodiment of the present invention will be described. As illustrated in FIG. 1 and FIG. 2, the walking assist device includes a seat member 1 where a user P sits astride, and a pair of left and right leg links 2 and 2 connected to the seat member 1.

Each leg link 2 can bend and stretch freely, composed of a first link member 4 and a second link member 6. The first link member 4 is connected to a first joint portion 3 provided in the seat member 1. The second link member 6 is connected to a lower end of the first link member 4 through a rotary-typed second joint portion 5. A lower end of the second link member 6 is connected with a ground contacting portion 8 through a third joint portion 7. The ground contacting portion 8 is configured to be mounted to each of right and left feet of the user P.

Each leg link 2 is provided with a driving source 9 for driving the second joint portion 5. Thereby, according to the rotation of the second joint portion 5 driven by the driving source 9, each leg link 2 is stretched in a direction of pushing the seat member 1 upward so as to generate an up-pushing force applied to the seat member 1 (hereinafter, referred to as a load relieving force).

The load relieving force generated in each leg link 2 is transmitted to the body trunk of the user P through the seat member 1 to relieve a load acted on a leg thereof.

The seat member 1 is composed of a seat portion 1a and a support frame 1b. The seat portion 1a has a saddle shape so as to be seated upon by the user P. The support frame 1b is disposed below the seat portion 1a to support the seat portion 1a.

The seat member 1 is further provided with a guide rail 3a of an arc shape, which constitutes the first joint portion 3 disposed in each leg link 2. Each leg link 2 is movably engaged with the guide rail 3a via a plurality of rollers 4b pivotally attached to a slider 4a. The slider 4a is fixed to the upper end of the first link member 4.

In this way, each leg link 2 swings in the anteroposterior direction around the center of curvature of the guide rail 3a and the anteroposterior swing fulcrum of each leg link 2 functions as the center of curvature of the guide rail 3a.

Furthermore, the guide rail 3a is pivotally supported at an uprising portion disposed at a rear end of the support frame 1b of the seat member 1 via a spindle 3b disposed in the anteroposterior direction. Therefore, the guide rail 3a is connected to the seat member 1 so as to swing freely in the lateral direction. Accordingly, each leg link 2 is allowed to swing in the lateral direction, enabling the user P to abduct the legs thereof.

In addition, the center of curvature of the guide rail 3a and the axis line of the spindle 3b are both located above the seat portion 1a. Thereby, the seat member 1 can be prevented from inclining greatly in the vertical direction and in the lateral direction when the user P shifts the body weight thereof.

The driving source 9 is an electric motor provided with a reduction gear 9a. The driving source 9 is disposed on a lateral surface of an upper end portion of the first link member 4 in each leg link 2. An output shaft of the reduction gear 9a is composed of a driving crank arm 9b and a driven crank arm 6a which are connected via a connection link 9c. The driven crank arm 6a is fixed concentrically with a joint shaft 5a of the second joint portion 5.

Thereby, a driving force output from the driving source 9 through the reduction gear 9a is transmitted to the second link member 6 through the connection link 9c so that the second link member 6 swings around the joint shaft 5a with respect to the first link member 4 to bend and/or stretch the leg link 2.

Each ground contacting portion 8 is composed of a shoe 8a and a connection member 8b which is fixed at the shoe 8a and extends upward. The second link member 6 of each leg link 2 is connected to the connection member 8b through the third joint portion 7 of a 3-axis structure. As illustrated in FIG. 1, a pair of longitudinally disposed pressure sensors 10 and 10, which detect loads acted on the metatarsophalangeal joint (MP joint) and the heel of each foot of the user P, respectively, are attached to the undersurface of an insole 8c provided in the shoe 8.

Moreover, a 2-axis force sensor 11 is built into the third joint portion 7. The support frame 1b of the seat member 1 has a controller 12 serving as a control unit built therein, and the first link member 4 has a battery 13 built therein.

Detection signals from the pressure sensors 10 and the force sensor 11 mentioned above are input to the controller 12. The controller 12 performs a walking assist control by controlling the driving source 9 to drive the second joint portion 5 so as to generate the load relieving force according to the detection signals from the sensors 10 and 11.

The load relieving force, when viewed in the lateral direction, is acted on a connection line (hereinafter, referred to as a reference line) joining a swing fulcrum of the leg link 2 with respect to the first joint portion 3 in the anteroposterior direction and a swing fulcrum of the leg link 2 with respect to the third joint portion 7 in the anteroposterior direction.

In the walking assist control, the controller 12 calculates an actual load relieving force acted on the reference line based on a detection force in the biaxial direction detected by the force sensor 11. More accurately, the actual load relieving force is a resultant force between the load relieving force and a force generated by the self weight of the seat member 1 and each leg link 2. Thereafter, on the basis of detection pressure by the pressure sensors 10 disposed in each ground contacting portion 8, the controller 12 calculates a ratio of the load acted on each foot with respect to the total load acted on both feet of the user P.

Then, the controller 12 calculates a desired control value of the load relieving force which should be generated for each leg link 2 by multiplying a predefined value of the load relieving force by the calculated ratio of the load acted on each foot. Subsequently, the controller 12 controls the driving source 9 so as to approximate the actual load relieving force calculated on the basis of the detection force by the force sensor 11 to the desired control value.

Meanwhile, the user P may want to have a rest during walking with the walking assist device mounted. Therefore, the walking assist device according to the present embodiment is provided with a lock mechanism 14 configured to lock the second joint portion 5 and an operation unit 15 configured to actuate the lock mechanism 14. The operation unit 15 may be operated by the user P.

Figure 3:
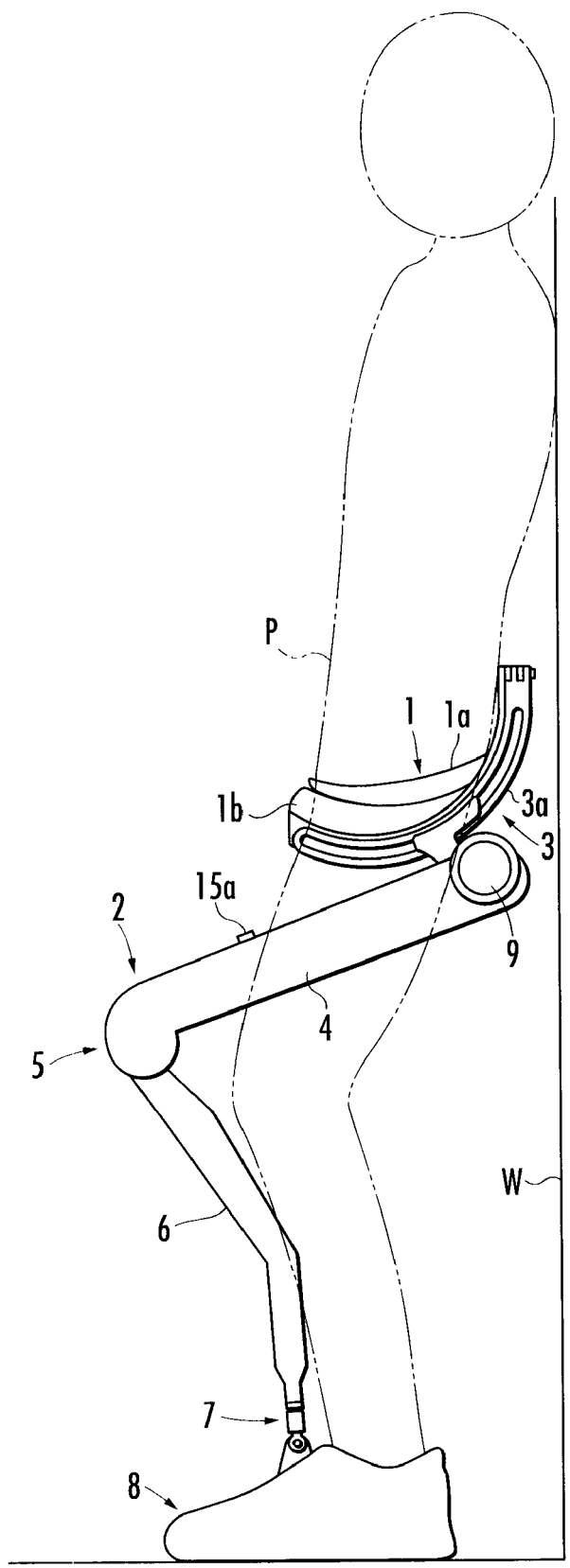
FIG. 3 is a side view of the walking assist device according to an embodiment of the present invention when a user is sitting on a seat member thereof.

According thereto, the user P operates the operation unit 15 to actuate the lock mechanism 14 so as to lock the second joint portion 5, preventing the seat member 1 from moving downwards. Thereby, as illustrated in FIG. 3, the user P can sit on the seat member 1 with the walking assist device mounted to have a rest, without applying any forces to the leg thereof.

Note that the seat member 1 may not be self standing even though the second joint portion 5 is locked. However, the user P can sit on the seat member 1 to have a rest by leaning on a wall W or the like with his/her back, or holding a supporter such as a handrail or the like with his/her hands.

Figure 4:
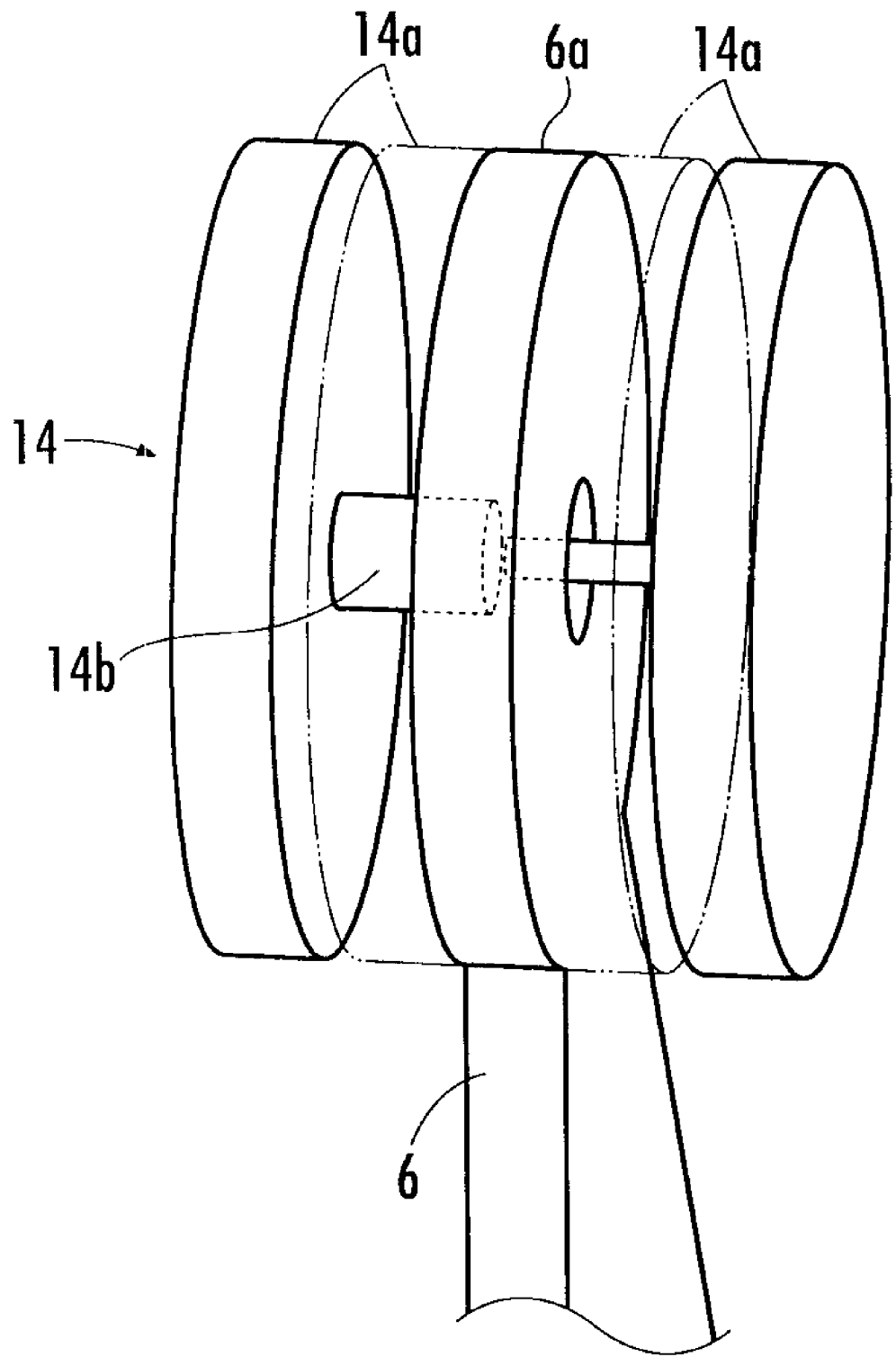
FIG. 4 is a perspective view of the walking assist device provided with a lock mechanism according to an embodiment of the present invention

As illustrated in FIG. 4, the lock mechanism 14 according to the present embodiment includes members fixed at the second link member 6, for example, a pair of braking plates 14a and 14a, and a linear actuator 14b for pushing and pulling the pair of braking plates 14a and 14a. The pair of braking plates 14a and 14a sandwich the driven crank arm 6a and are locked at the first link member 4. Note that the lock mechanism 14 is not limited to the mentioned configuration.

The operation unit 15 includes an operation switch 15a and the controller (control unit) 12. The operation switch 15a is provided at a location, for example, the first link member 4 of the leg link 2 of either side, so that the operation switch 15a may be switched on and off by the user P.

Figure 5:
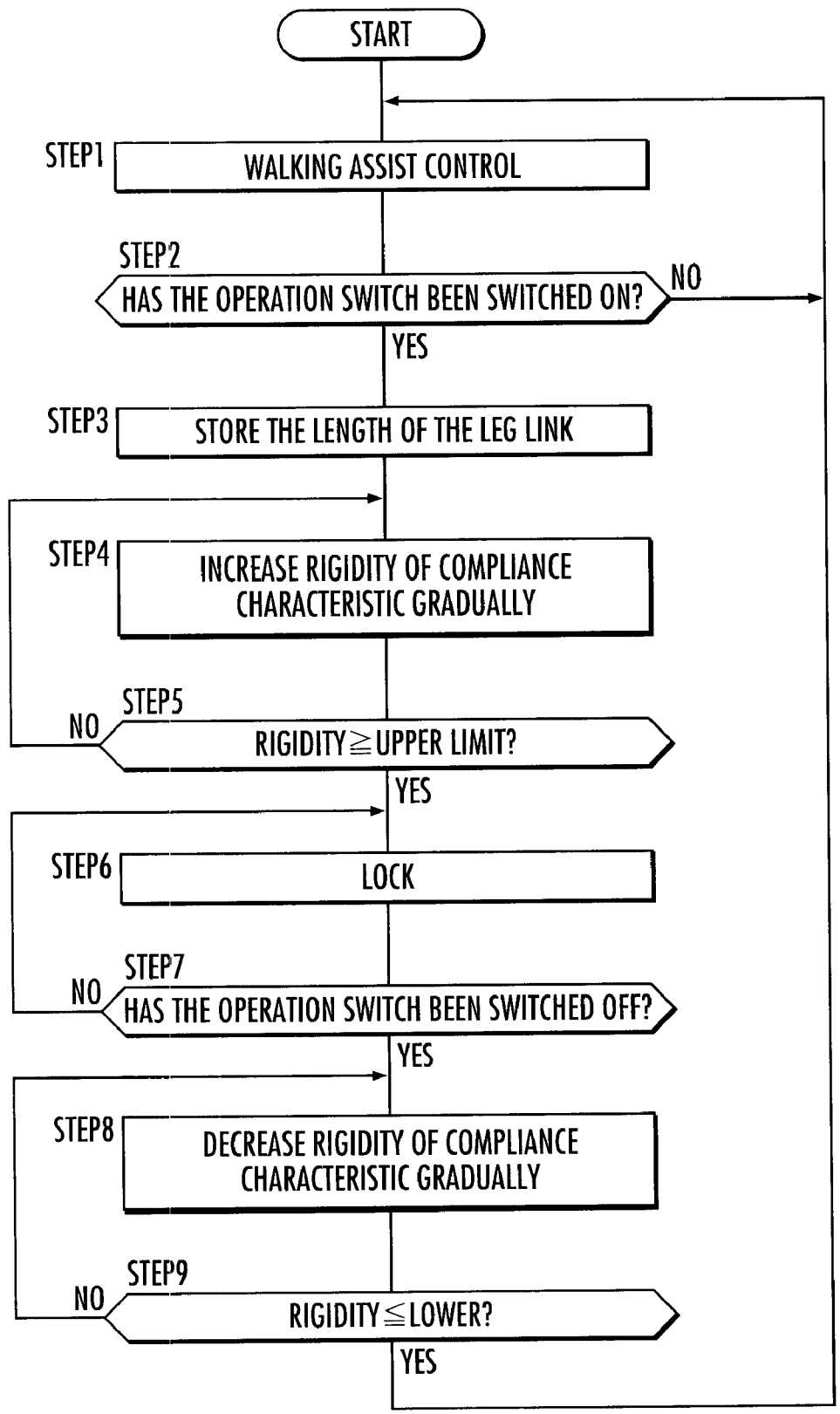
FIG. 5 is a flow chart illustrating a control process performed by a controller disposed in the walking assist device according to an embodiment of the present invention.

As illustrated in FIG. 5, the controller 12 performs the aforementioned walking assist control (STEP 1). Thereafter, the controller 12 determines whether the operation switch 15a has been switched on (STEP 2). If the operation switch 15a is determined to be switched off, the process returns back to STEP 1, the controller 12 continues to perform the walking assist control.

When the operation switch 15a is determined to have been switched on, firstly, the controller 12 stores a leg link length at the time when the operation switch 15a is switched on (STEP 3). The leg link length is a distance from the center of curvature of the guide rail 3a to the third joint portion 7. Additionally, the leg link length can be geometrically calculated from a flexion angle of the second joint portion 5 and the flexion angel may be obtained according to signals from an encoder provided in the driving source 9.

Figure 6:
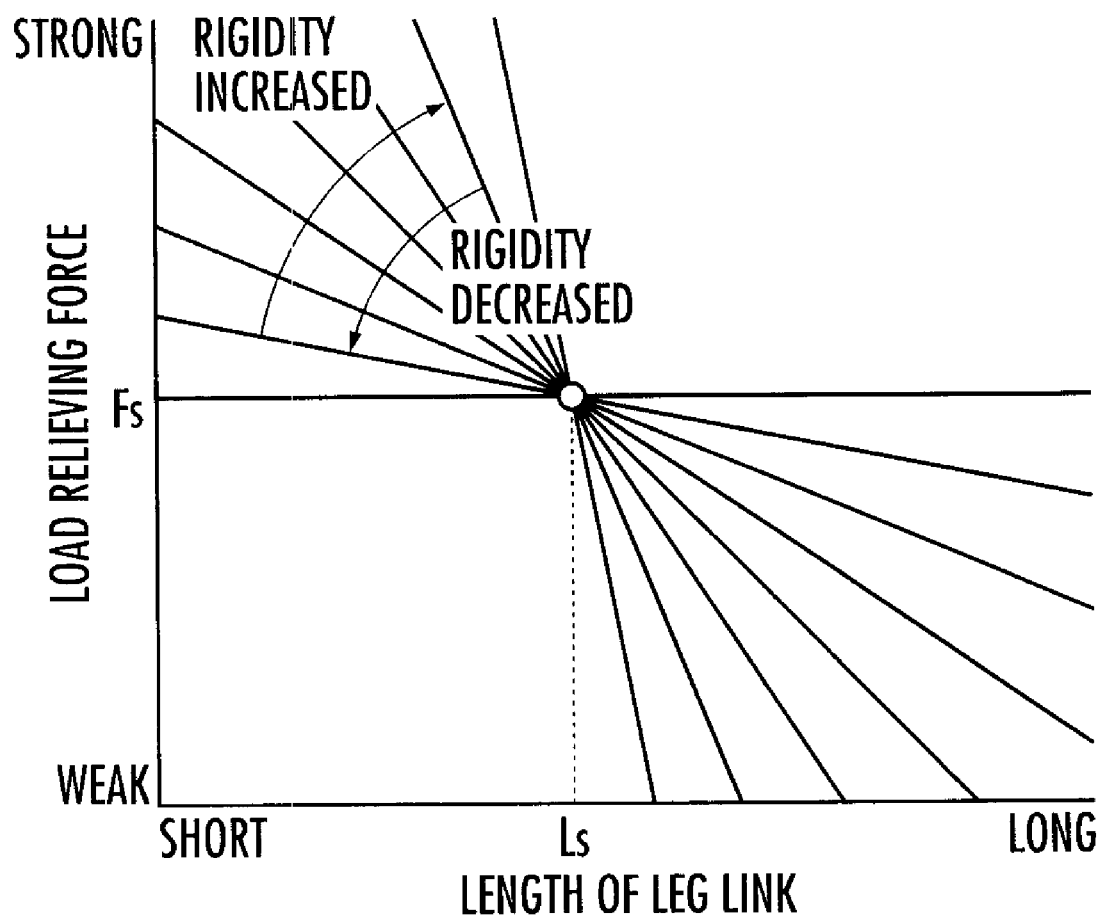
FIG. 6 is a graph illustrating an increased and decreased rigidity of compliance characteristic.

Thereafter, the controller 12 performs a control which gradually increases the rigidity of compliance characteristic (STEP 4). Specifically, as illustrated in FIG. 6, the controller 12 defines a line in which the load relieving force becomes greater according to a shortened amount of the leg link length (descent amount of the seat member 1). Then, the controller 12 controls the driving source 9 so that the load relieving force varies according to the line. The line in which the load relieving force becomes greater passes through a point defined according to a stored leg link length Ls and a preset load relieving force Fs.

Meanwhile, the controller 12 performs a control which increases with time a variation rate (rigidity) of the load relieving force with respect to the shortened amount of the leg link length. When the rigidity reaches a given upper limit (STEP 5), the controller 12 actuates the lock mechanism 14 to lock the second joint portion 5 (STEP 6).

According thereto, when the seat member 1 descents from a normal working height due to the enervation of the leg of the user P, the load relieving force is enhanced at an accelerated pace, and the lock mechanism 14 is actuated thereafter. Thereby, the user P can make a shift from walking to sitting on the seat member 1 smoothly.

When the operation switch 15a is switched off (STEP 7), the controller 12 performs a control which gradually decreases the rigidity of compliance characteristic (STEP 8). When the rigidity reaches a given lower limit (STEP 9), the controller 12 shifts to perform the normal walking assist control (STEP 1).

Note that in the above-mentioned embodiment, the controller 12 is configured to perform the control which gradually increases the rigidity of compliance characteristic and actuate the lock mechanism 14 when the rigidity reaches the given upper limit. It is acceptable that the controller 12 controls the driving source 9 to enhance the load relieving force according to the shortened amount of the leg link length. In this situation, the controller 12 actuates the lock mechanism 14 when the load relieving force is increased to a given value.

In addition, the lock mechanism 14 may be actuated when storing or transporting the walking assist device. Accordingly, the walking assist device becomes stable in shape since the leg link 2 will not bend or stretch, which makes it easy to be handled.

Although the embodiment of the present invention has been described hereinabove with reference to the drawings, the present invention is not limited thereto. For example, the lock mechanism 14 may be configured as a manually operable one which can be actuated through operating an operation member such as a level or the like. In this case, the operation member corresponds to the operation member.

The actuator for the lock mechanism 14 may be configured as one which maintains the lock mechanism 14 at a locking state even when the electrical supply to the actuator is stopped. According thereto, the electricity can be saved in the locking state.

In the above-mentioned embodiment, the leg link 2 is configured as a telescopic link with a rotary second joint portion 5 disposed therein; it is acceptable that the leg link 2 is configured as a telescopic link having a linear second joint portion.

In the above-mentioned embodiment, the first joint portion 3 is configured to have an arc-shaped guide rail 3a and the swing fulcrum of each leg link 2 in the first joint portion 3 along the anteroposterior direction is located above the seat portion 1a of the seat member 1; however, the first joint portion 3 is not limited thereto. For example, the first joint portion 3 may be configured as a simple-structured joint portion having a spindle to pivotally support each leg link 2 so that the upper end portion thereof can freely swing in the anteroposterior direction.

What is claimed is:

1. A walking assist having a seat member where a user sits astride, a pair of leg links connected to the seat member and each provided with an in-between joint portion, and a pair of driving sources for driving the respective joint portions, in which each of the pair of leg links is actuated in a direction of pushing up the seat member according to the driving of the joint portions driven by the pair of driving sources to support at least a part of a body weight of the user through the seat member, comprising:

a pair of lock mechanisms configured to lock the respective joint portions to support at least a part of the body weight of the user through the seat member independent from the driving of the joint portions by the pair of driving sources, and an operation unit configured to be operated by the user to actuate the pair of lock mechanisms, wherein the operation unit is composed of an operation switch and a control unit, the operation switch is configured to be switched on and off by the user, and the control unit is configured to control the pair of driving sources to increase an up-pushing force applied to the seat member according to a descent amount of the seat member and perform a control in which a variation rate on the up-pushing force applied to the seat member is increased with time according to the descent amount of the seat member when the operation switch is switched on, and to actuate the pair of lock mechanisms when the variation rate is increased to a given value.

2. A walking assist device having a seat member where a user sits astride, a pair of leg links connected to the seat member and each provided with an in-between joint portion, and a pair of driving sources for driving the respective joint portions, in which each of the pair of leg links is actuated in a direction of pushing up the seat member according to the driving of the joint portions driven by the pair of driving sources to support at least a part of a body weight of the user through the seat member, comprising:

a pair of lock mechanisms configured to lock the respective joint portions to support at least a part of the body weight of the user through the seat member independent from the driving of the joint portions by the pair of driving sources, and an operation unit configured to be operated by the user to actuate the pair of lock mechanisms, wherein the operation unit is composed of an operation switch and a control unit, the operation switch is configured to be switched on and off by the user, and the control unit is configured to control the pair of driving sources to increase an up-pushing force applied to the seat member according to a descent amount of the seat member when the operation switch is switched on, and to actuate the pair of lock mechanisms when the up-pushing force applied to the seat member is increased to a given value.

* * * * *